Figure 11:
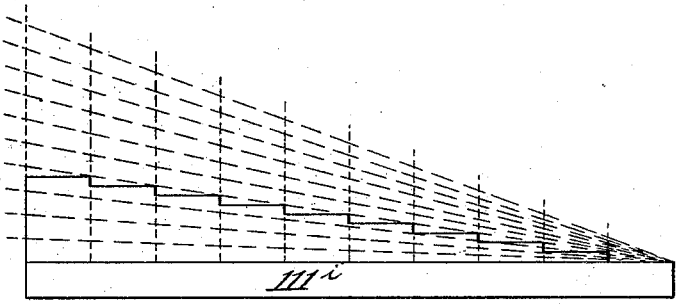

No. 844,555. PATENTED FEB. 19, 1907.
B. M. DES JARDINS.
TYPE JUSTIFIER.
APPLICATION FILED JULY 1, 1895. RENEWED JUNE 5, 1906.
9 SHEETS—SHEET 1.
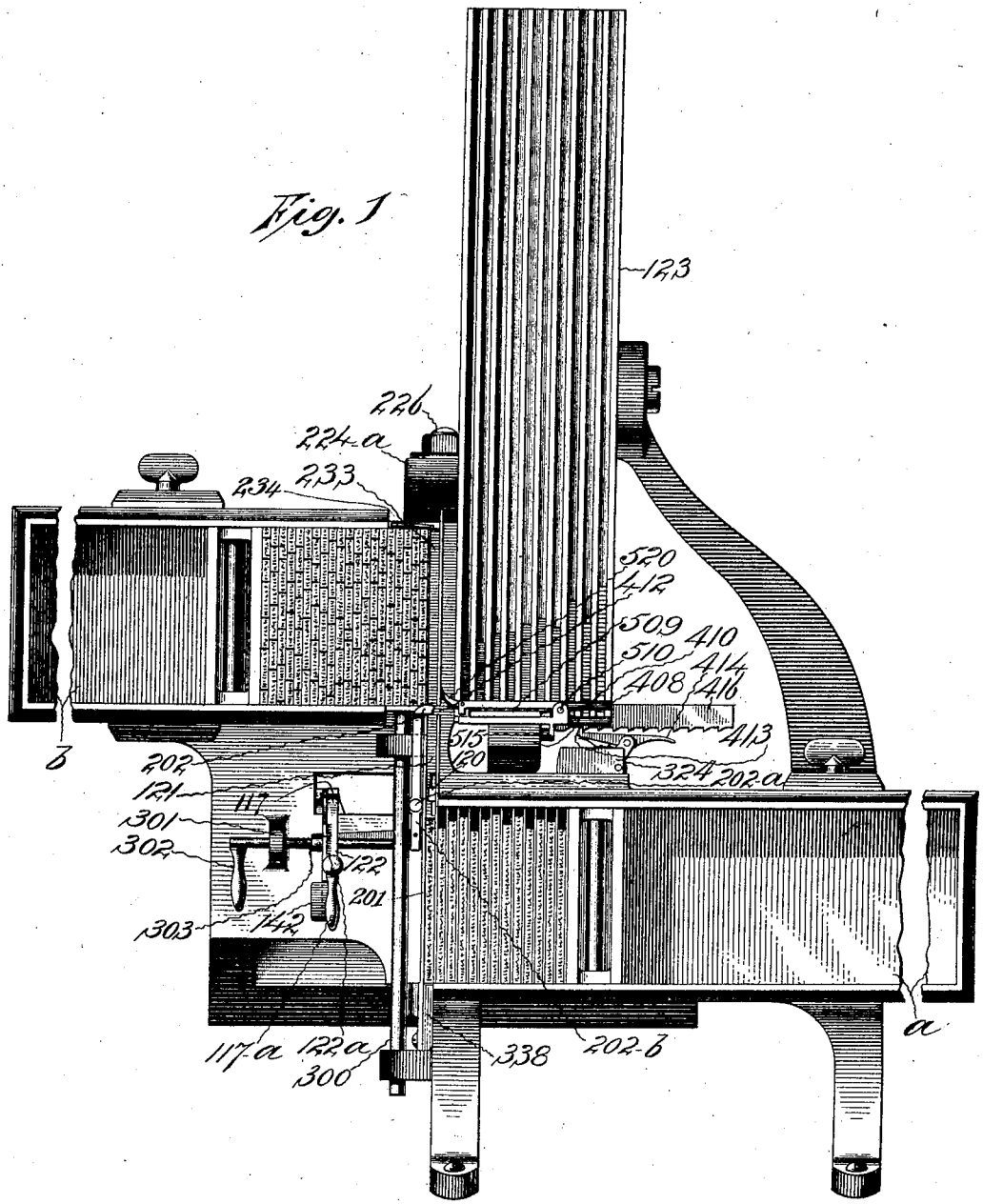

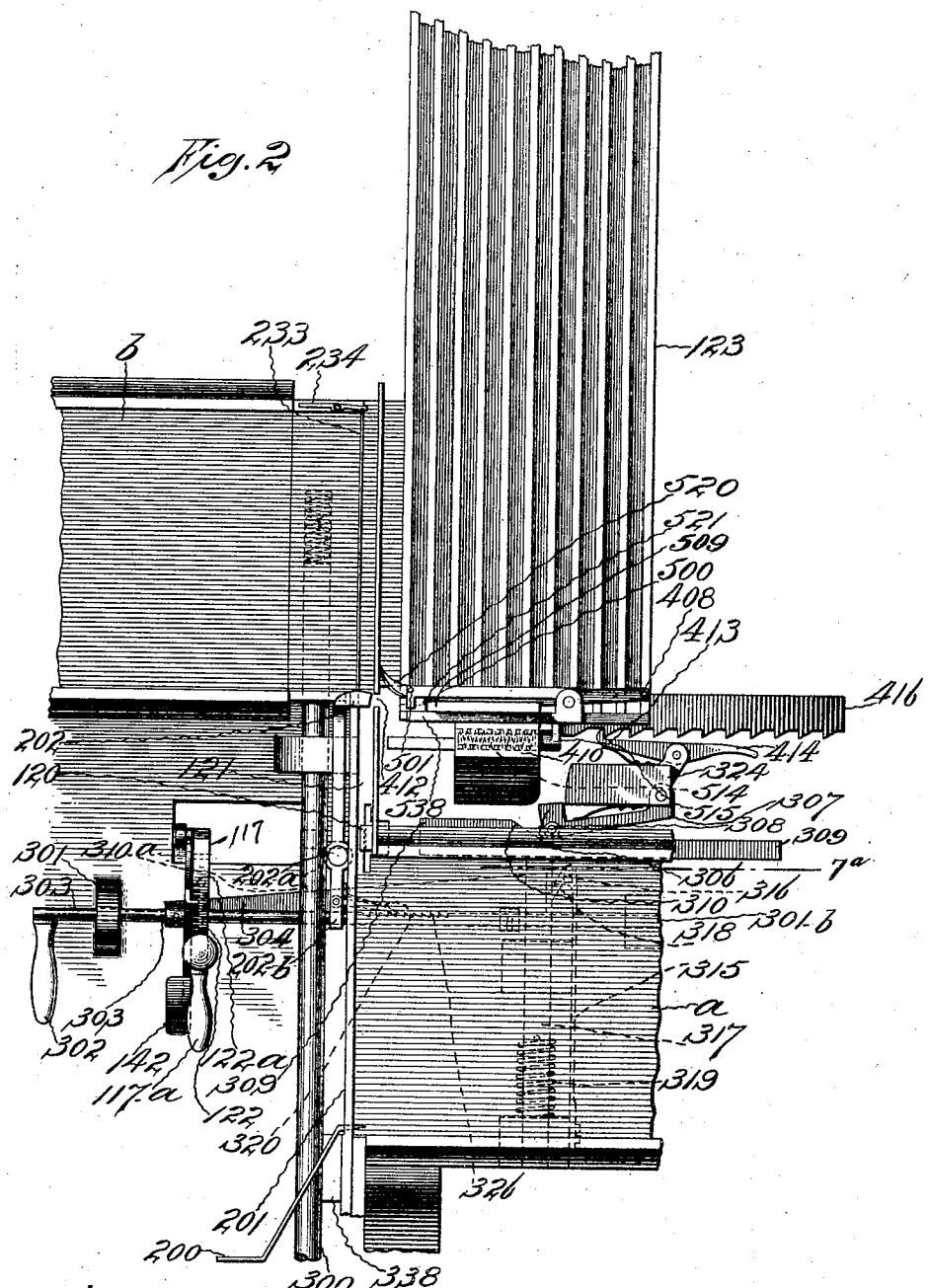

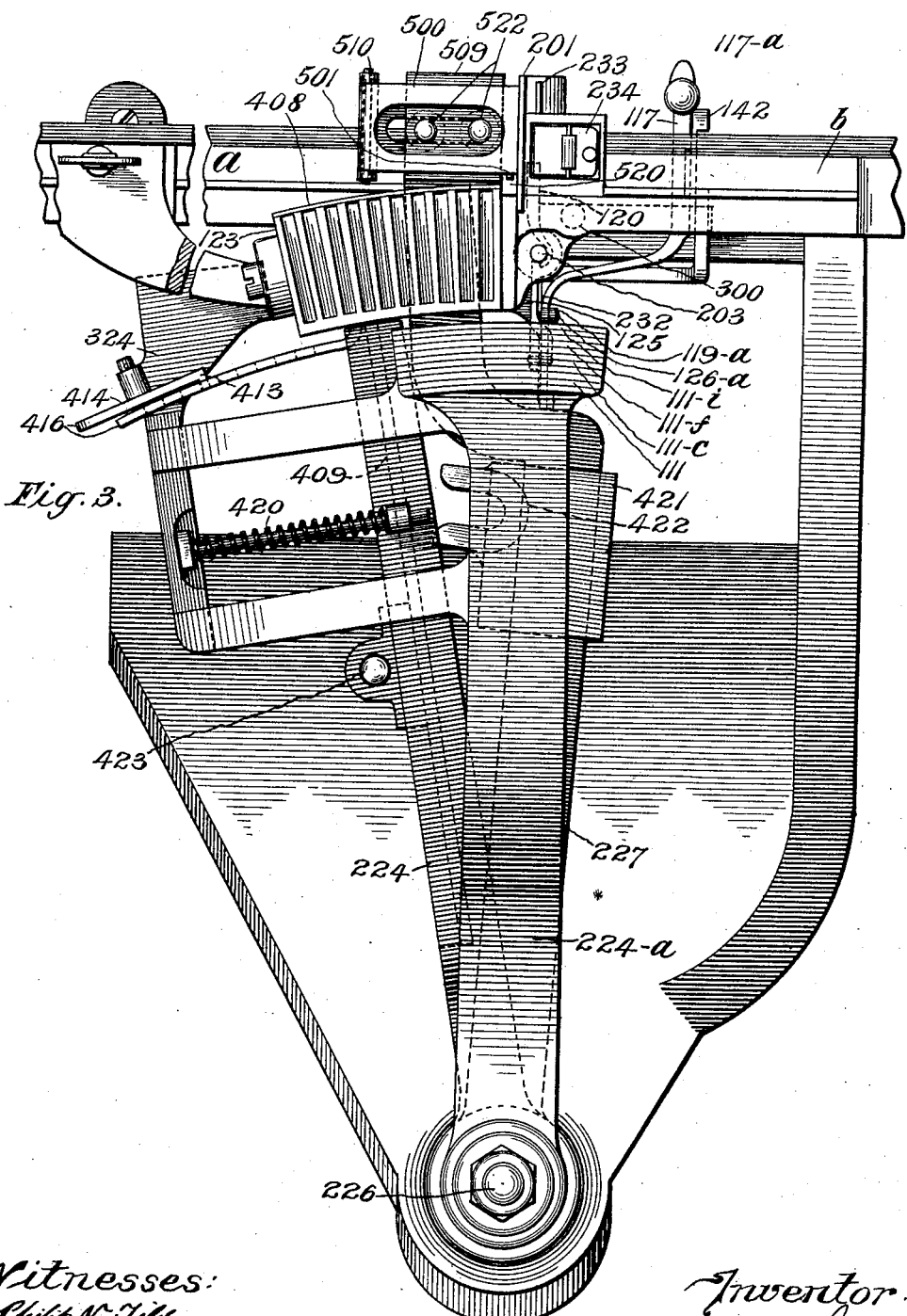

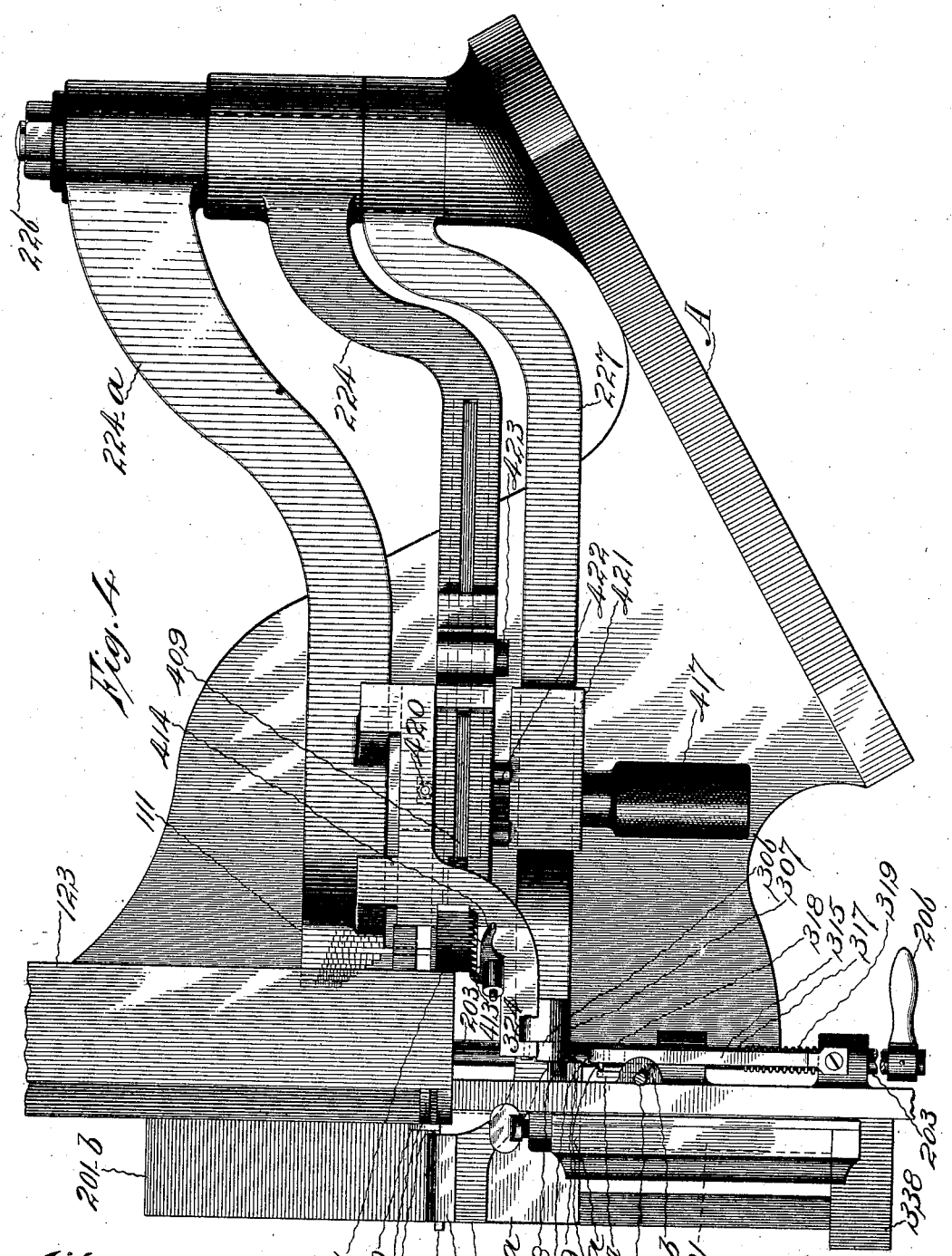

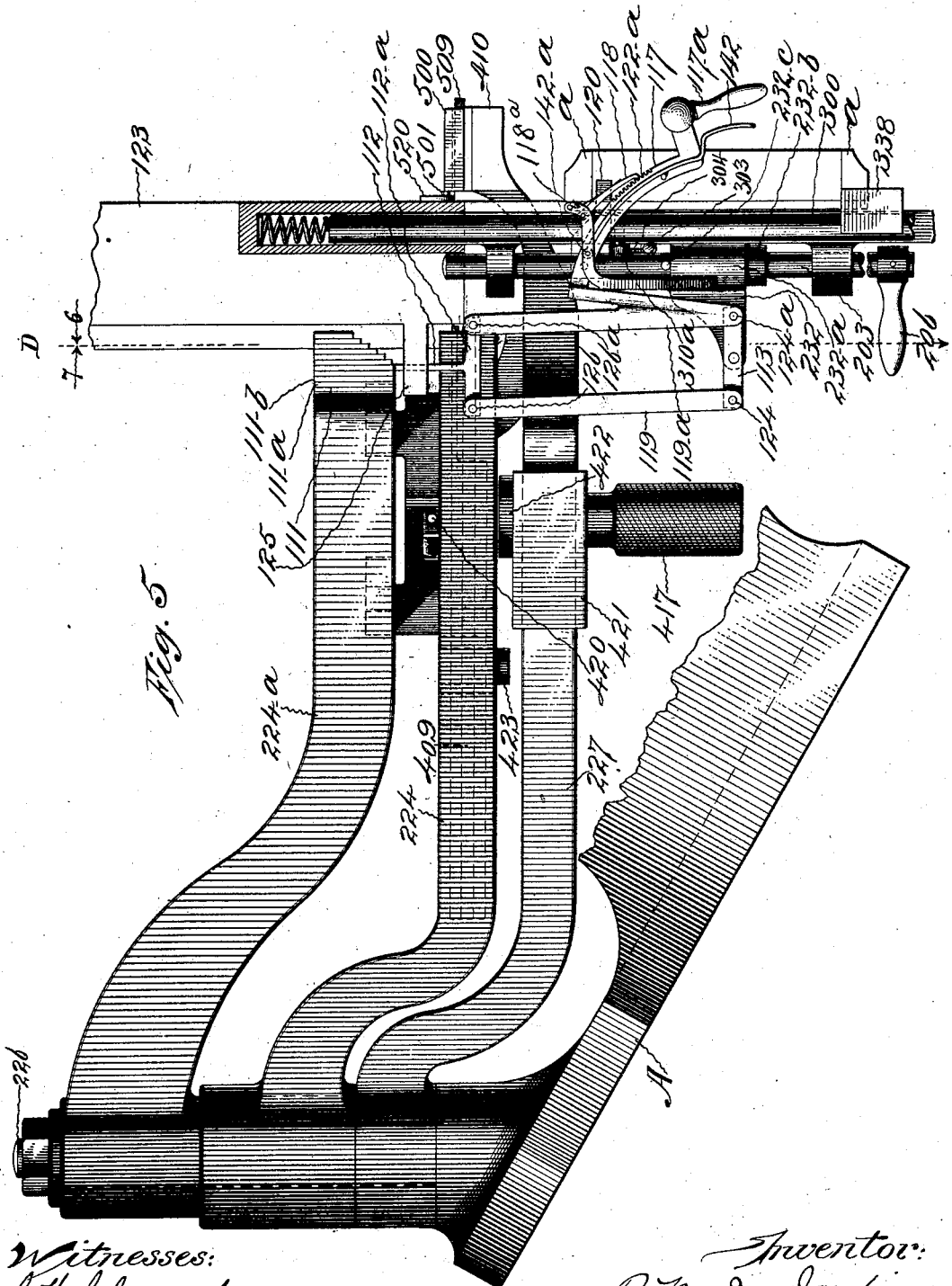

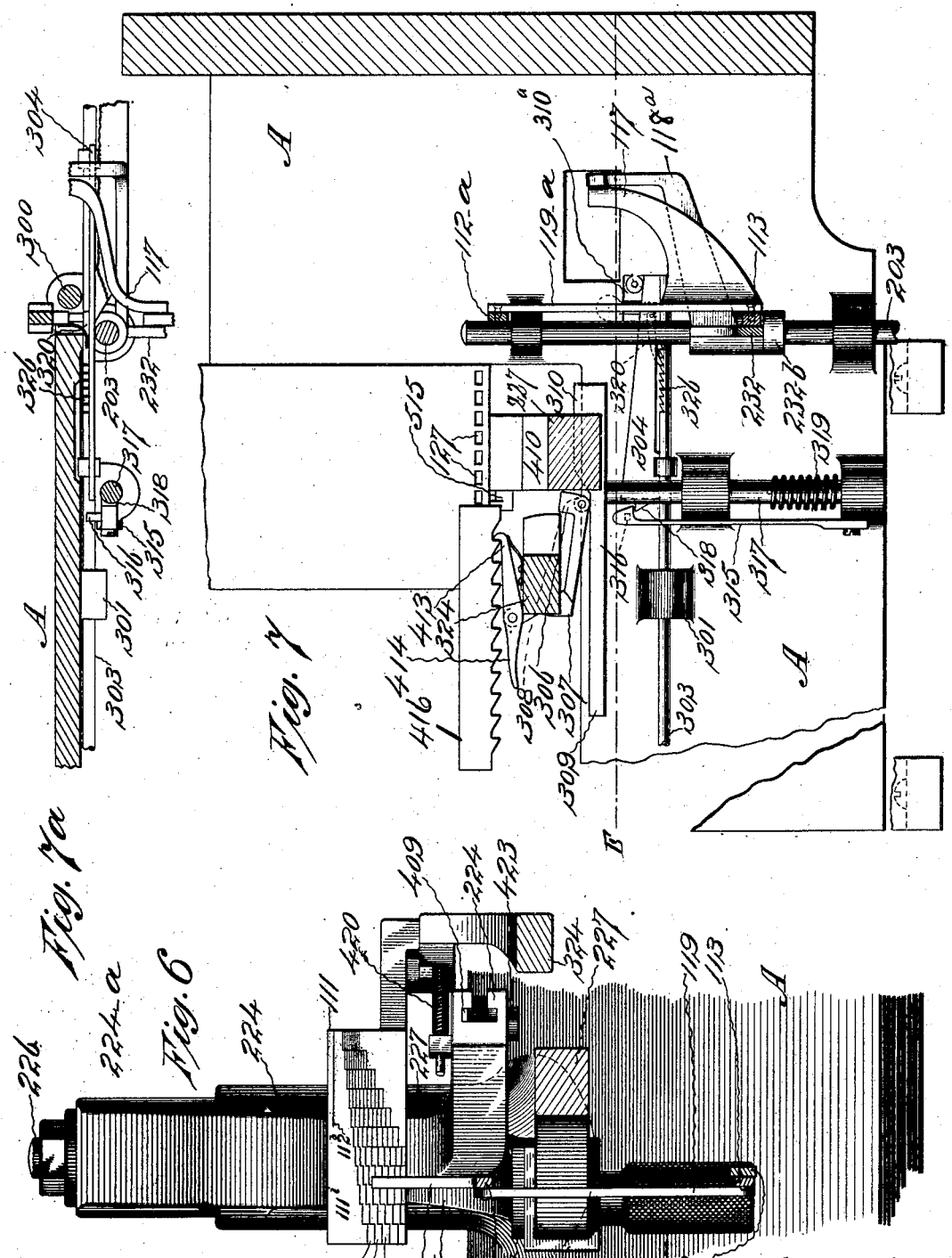

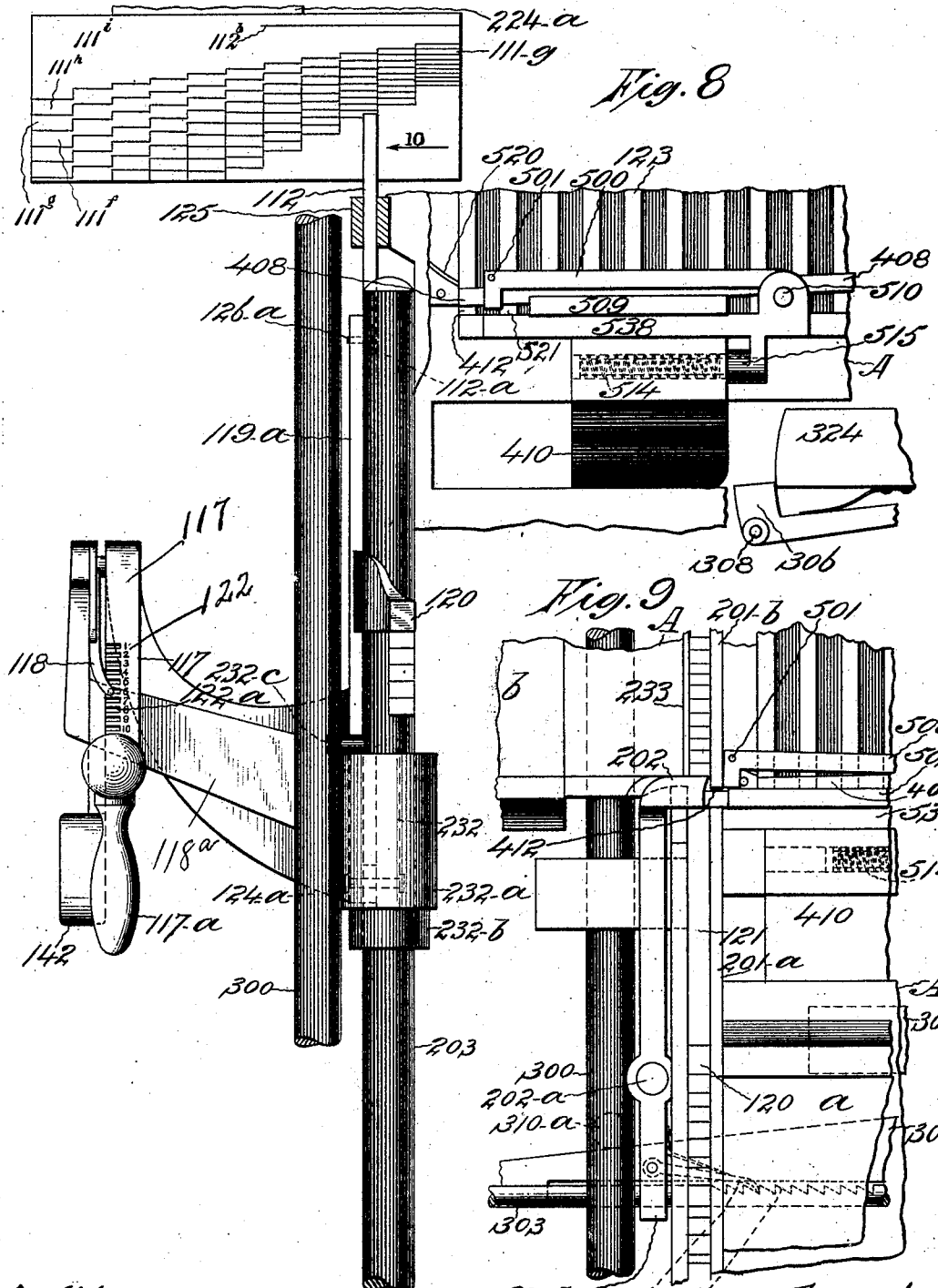

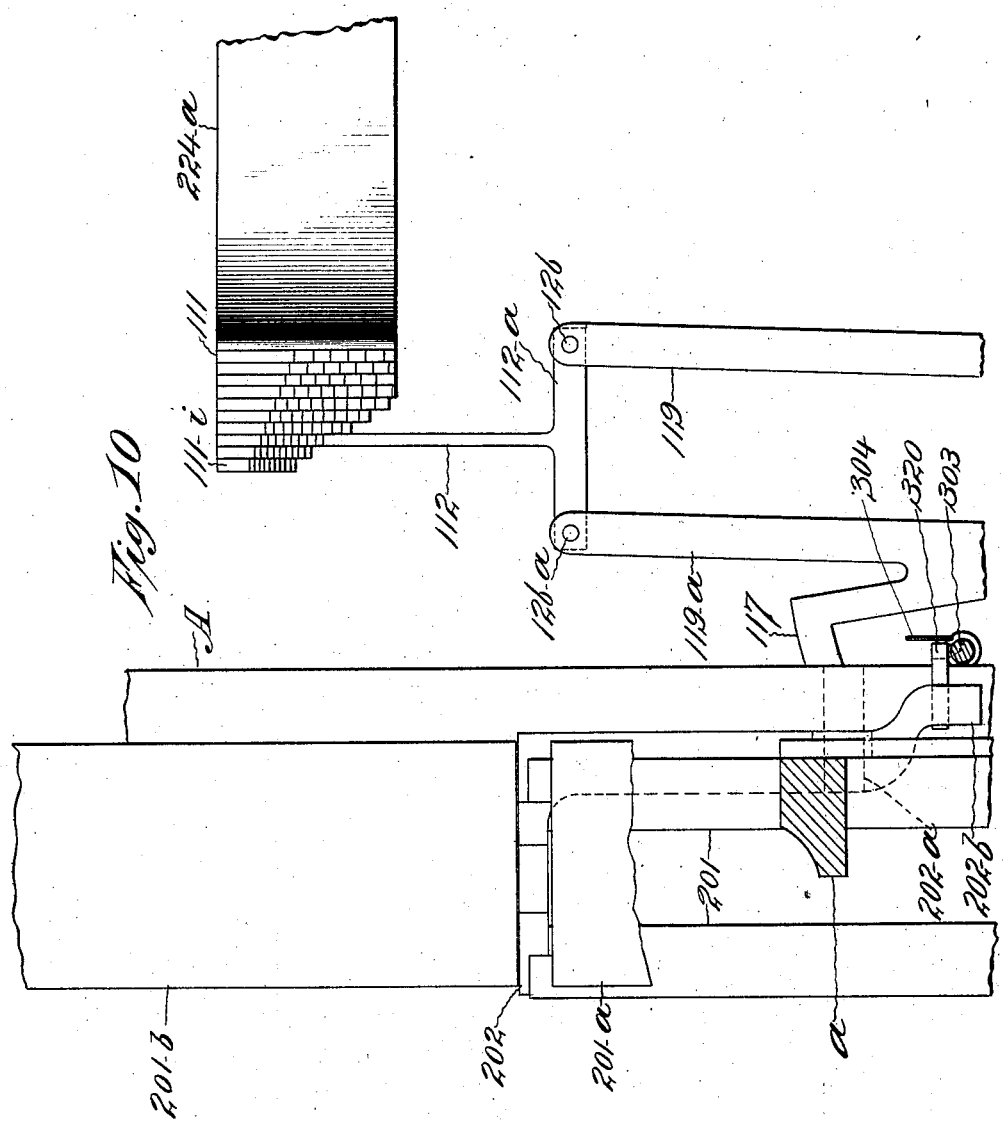

No. 844,555. PATENTED FEB. 19, 1907.
B. M. DES JARDINS.
TYPE JUSTIFIER.
APPLICATION FILED JULY 1, 1895. RENEWED JUNE 5, 1906.

9 SHEETS—SHEET 9.

Witnesses:
C. W. Clement
C. E. Brickland

Inventor:
B. M. Des Jardins
By J. H. Watson
atty

UNITED STATES PATENT OFFICE.

BENJAMIN M. DES JARDINS, OF HARTFORD, CONNECTICUT, ASSIGNOR, BY MESNE ASSIGNMENTS, TO THE UNITYPE COMPANY, A CORPORATION OF NEW JERSEY.

TYPE-JUSTIFIER.

No. 844,555.   Specification of Letters Patent.   Patented Feb. 19, 1907.

Application filed July 1, 1895. Renewed June 5, 1906. Serial No. 320,226.

*To all whom it may concern:*

Be it known that I, BENJAMIN M. DES JARDINS, a citizen of the United States, residing at Hartford, in the county of Hartford and State of Connecticut, have invented a new and useful Type-Justifier, of which the following is a specification.

My invention relates to justifying mechanism.

The particular embodiment of the invention, hereinafter described, and illustrated in the accompanying drawings, is a machine for justifying assembled lines of type. The basic principles of my justifying mechanism may, however, be utilized in connection with other forms of composing-machines, such as linotype and matrix-making machines, and it is to be understood that I desire protection for the invention commensurate with its utility.

In the following specification I shall term the difference between the amount of matter in an unjustified line and the required length of the line or column measure the "shortage" of the line. The places between words in which justifying-spaces are to be inserted I shall term "intervals," the number of intervals in a line being of course one less than the number of words. The final quads or pieces used to separate the words in the justified lines will be termed "justifying-spaces." The shortage of the line divided by the number of intervals will give the average width of the justifying-spaces, and this average width I shall term a "normal" space in contradistinction to the justifying-spaces, which may, in some instances, be partly less and partly greater in width than the normal. The term "type" as used herein will be understood to include matrices such as are used in linotyping, as well as ordinary printers' type.

My invention contemplates justifying lines of type or composition by applying to the line justifying-spaces of sufficient aggregate value to fill the line to the contemplated length or column measure without affecting the space occupied in the line by the type or characters. This may be done by utilizing normal justifying-spaces equal to the quotient of the shortage divided by the number of intervals, by utilizing a group of spaces of two or more different values equal in aggregate width to the shortage of the line and equal in number to the intervals in the line, or by utilizing a still larger number of spaces equal in aggregate width to the shortage and adapted to be combined in subgroups to form justifying-spaces. In either case a device is necessary which will represent the number of intervals and which will distribute the shortage either equally or unequally among said intervals in the line under justification. My invention includes, broadly, the use of such a device, whether in the form illustrated and described or in any other form which will accomplish the result sought, by what may be termed a "mechanical selection" or "computation," governed by the number of intervals and the shortage of the line to be justified. My invention as applied to the justification of lines of type or matrices includes any device for automatically and mechanically combining the shortage and the number of intervals of a line to compute in advance or predetermine the widths of justifying-spaces required to justify the line. This device is applicable generally in justifying mechanism, whether the justifying-spaces determined thereby are formed in the machine, as by casting or cutting off space-timber or are supplied or indicated in any other manner; but the machine illustrated and described herein employs what are known as "ready-made" spaces—that is, justifying-spaces of various sizes made in advance, from which the spaces required to justify different lines are selected.

In justifying composed lines of type it is impossible to provide in advance the number of different sizes which would be required to justify every line with normal spaces. I use instead a magazine provided with a limited number of spaces differing from each other by fixed amounts which for convenience I shall term "units." It will be evident that any line may be justified by a combination of spaces comprising not more than two sizes differing from each other by a unit. Such justification is not absolutely correct; but in practice it always comes within a half-unit of the column measure, and the units may be made sufficiently small to effect practically perfect justification by the use of a sufficient number of space values. In practice six to twelve sizes of spaces will be found sufficient, depending upon the kind of matter under treatment.

As above stated, it usually requires two sizes of spaces to justify a line. The selecting device may be set to select the larger size first and at the proper time shifted to select the next smaller size, or it may be shifted from the smaller size to the larger size. I provide a controller to effect this shifting, and I set the controller for the spacing of each line by what I shall term "remainder" devices—that is, devices which measure and are controlled by the portion of the shortage which would remain if the line were spaced with the largest size of justifying-spaces which could be inserted uniformly throughout. For example, if a given line had five intervals and twenty-three units of shortage the largest size of space which could be uniformly inserted would be the four-unit space. Five four-unit spaces would aggregate twenty units and the remainder would equal three units. The function of the remainder devices is to measure or gage the remaining three units, and these devices include a controller, which is set automatically to effect the distribution of the three units equally in three of the intervals, the justification of the line being therefore accomplished by inserting two four-unit spaces and three five-unit spaces. In the present machine the larger spaces are first inserted and then the smaller spaces.

One of the principal features of the embodiment of my invention illustrated in the accompanying drawings is a series of gages which are used to determine the sizes of spaces necessary to justify any line submitted to the machine. In this series there is a gage for each possible number of intervals which may occur in a line—that is, there is a gage for a line having four intervals, another gage for a line having five intervals, &c. These gages have ten operative edges, which in the construction illustrated are stepped. The depths of the steps depend upon the number of different sizes of spaces with which the machine is provided. It will be understood that the gages are both inclined and stepped, the general incline formed by the successive steps depending upon the number of intervals in the line which the gage is adapted to justify and the depth of the steps depending upon the number of sizes of spaces from which selection is to be made.

In the machine illustrated the gage for each line is selected by the operator after he notices the number of intervals in the line. The line is then measured mechanically, and the element representing the shortage of the line is brought into contact with the selected gage. This action serves to locate the size or sizes of spaces necessary to justify the line. If there be no remainder, a single size will serve to justify the line. If there be a remainder it will be indicated and represented by a proportionate amount of looseness or play between the aforesaid element and the gage. A "remainder-gage," which is shown in the form of a wedge or incline, is brought into action to measure the remainder and to set the "controller," which determines the number of each size of space to use.

Other features of the invention will be pointed out in the following specification, reference being had to the accompanying drawings, in which—

Figure 12:
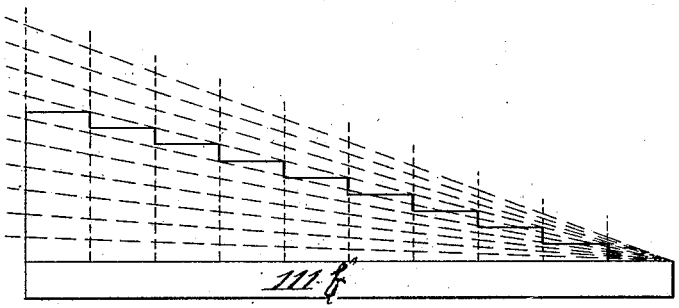
Figure 13:
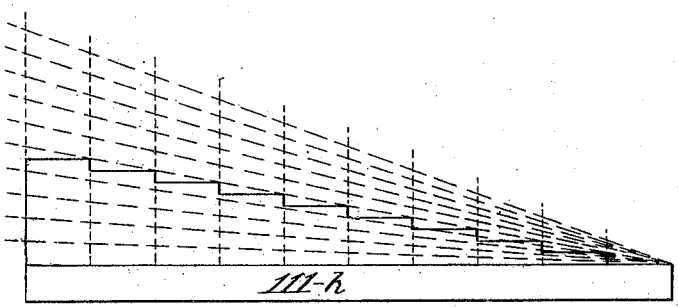
Figure 14:
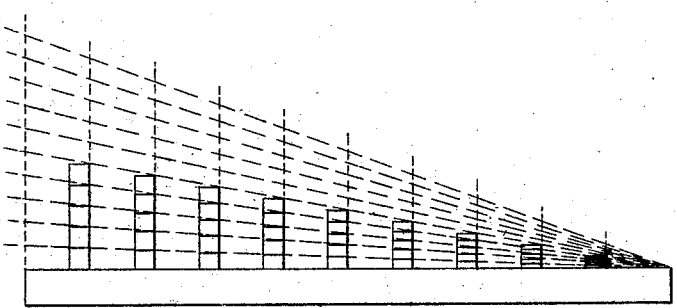

Figure 1 is a front elevation of my machine. Fig. 2 is a partial front elevation showing additional details. Fig. 3 is a plan view of the same, but showing the parts in a different position; Fig. 4, a right side elevation of said machine; Fig. 5, a left side elevation, a part of the frame being cut away; Fig. 6, a vertical section taken behind said channels looking toward the rear or pivotal points of the arms from the line D, Fig. 5; Fig. 7, a vertical section taken behind the space-channels looking toward the front of the machine from the line D, Fig. 5, but showing the parts in a different position of the gage-plates; Fig. 7$^a$, a sectional view taken on Fig. 7 on line E of Fig. 7 looking downward; Fig. 8, an enlarged detail view showing the relation between the line-gage 120 and the gage-plates 111, &c.; Fig. 9, an enlarged detail view showing the mechanism adjoining the line-channel; Fig. 10, a detail looking in the direction of the arrow 10, Fig. 8, showing the gage-plates 111, &c., and the gage projection or contact-piece 112. Figs. 11 to 13, inclusive, are diagrams illustrating the geometrical construction or lay-out of the gage-plates; and Fig. 14 shows the relation of one of said plates to the piles of spaces which it represents and is typical of the relation existing between the other plates and their corresponding spaces.

Similar letters and figures of reference designate like parts in the drawings and specification.

The frame is designated by A, and the primary measuring elements or gages by 111 111$^a$ 111$^b$, &c., to 111$^l$. The parts closely allied to said elements are indicated by numerals ranging from 111 upward, but under 200, the miscellaneous members by 200 and upward, the difference-measuring elements by 300, &c.; the members comprising the primary space-dislodging devices by 400, &c., and the members comprising the mechanism for handling the spaces while they are being transferred from the reservoir to the line by 500, &c.

The galley $a$ for unjustified lines of type is located at the front lower part of the machine to the right, and the left end of said galley terminates in the line-channel 121. The left wall 201 of the channel 121 forms an abutment or stop to limit the successive movements to the left of the type-column as it is actuated line by line. The wall is slotted to receive the right projecting end of the rule 200. The channel 121 extends upward to the top of the galley *b*, said galley being located above and to the left of the galley *a* and designed to receive the type-lines after they are justified. The left wall at the upper end of the channel 121 is formed by the removable rule 233, which fits into a suitable groove in the lower side of an extension of the galley *b* and has the latch 234 to hold it in place at the top. After a line of type has been justified the rule 233 is withdrawn from its present position and inserted at the right of said line for the purpose of moving the same into the galley *b*. The L-pawl 202 is pivoted at 202ª to that portion of the frame A which is back of the channel 121 and extends across said channel at the base of the galley *b* to support the part or parts of the line that have had the spaces inserted between the words. The upright body of the pawl 202 is located behind the path of the rule 200, while the upper end extends forward into the channel 121. Said upper end is channeled to mesh into corresponding slots and notches in the wall 201 and the lower edge of the right extension of the galley *b*, Figs. 9 and 10. Said pawl is provided with the downwardly-extending lever 202ᵇ, extending through an opening in the frame. The longitudinally-movable rod 203 supports the line-gage projection or block 120, which extends forward into the channel 121, Figs. 1 and 8. The bearings of said rod are in the frame A, and it is adapted to be moved up and down, according to the various lengths of lines to be measured. Said rod is also adapted to rotate sufficiently to throw the block 120, which is rigidly fastened to it, into the channel 121 and over the type-line for the measurement of the latter, then off from said line and to one side of said channel while the words composing this line are being transferred to the upper part of the channel. The arm 224 is pivoted to the frame A at 226, and its free front end is adapted to swing from one side to the other of the space-channels 123. This arm is supplemented by the arm 224ª, also pivoted at 226, said arms being connected to each other in such a manner through the medium of the spring 420 and its supports that when one of them is located at a given point the normal position of the second relatively corresponds to that of the first.

The arms 224 and 224ª support the mechanical elements for which they are respectively constructed—that is, the former carries the space-plunger 409, and the latter is equipped with the gage-plates 111 111ª, &c. The gage-plates 111 111ª, &c., are constructed with reference to their measuring dimensions across their respective shoulders or steps to represent all probable amounts of line shortages, each of said plates representing a different number of intervals and the steps standing for numerically-equal piles of different sizes of spaces. These gage-plates are illustrated in Figs. 11, 12, and 13 of the drawings, where they appear in a reversed position to that actually maintained when in the machine, said position being more convenient for comparison between said plates and the space-piles which they represent, as further illustrated in Fig. 14. The function of these gage-plates may be regarded as that of inserting a substitute space pile into the line shortage, or it may be regarded as changing the open space into which the required line should fit to a temporary opening into which the particular line being measured would fit if it were possible to accurately justify it by the same size of spaces throughout. The operative face of each plate is on a general incline, as well as stepped, the angle of the incline depending upon the number of spaces in the line which the gage is adapted to justify and the width and depth of the steps upon the number of the sizes of spaces provided in the machine.

The longitudinally-movable line-gaging rod 203 is mounted behind the frame A, back of the channel 121, and is provided with the handle 206, with which to adjust said rod, Figs. 4 and 5. The line-gage block 120, which is affixed to the rod 203 when in position on top of the incomplete type-line in the line-channel 121, locates the height of said rod. The rod 203 is provided with the rearwardly-extending intermediate loose projection 232, having the sleeve 232ª. The sleeve 232ª of the projection 232 is held in position relative to the rod 203, which passes through the same, by means of the collar 232ᵇ, rigidly attached to said rod below said sleeve, and the pin 232ᶜ, extending from the rod above. Hence the longitudinal motion of the latter is imparted to said sleeve. The arrangement of parts just described provides for a rotary motion of the rod 203 independent of the sleeve 232ª for the purpose of bringing the block 120 into or out of the channel 121, as already referred to; but the vertical movement of said rod in either direction carries said sleeve with it, as when the latter is lowered to bring said block against the type-line, said sleeve causing the projection 232 to move down with said gage to accurately register the height of said line.

The projection 232 supports the parallelogram bars 119 and 119ª by means of the short bar 113, centrally pivoted to said projection, the bases of said bars 119 and 119ª being pivoted at 124 and 124ª, respectively, to opposite ends of said bar 113. The gage projection 112, hereinafter termed the "contact-piece," has its cross-piece or T 112ª pivoted to the upper ends of the bars 119 and 119ª at 126 and 126ª. The bar 119ª is provided with the integral arc-shaped lever 117, which has the releasing-lever 142 pivoted upon said arched lever at 142ª. The pawl 118, which is pivoted to an arm 118ª, carried by the projection 232, has its downwardly-projecting beak adapted to enter or register with the nicks 122ª adjoining the scale 122 on the lever or arc 117. The nicks 122ª are proportioned or spaced to correspond to the depths of the plates 111, &c., and since the parts are timed with reference to said depths and to the distances between said nicks and the pivots 124ª and 126ª when the pawl 118 engages any one of said nicks in the arc 117 the contact-piece 112 is brought into line with the plate 111 or 111ª, &c., corresponding to the nick so engaged. The lever 142 is adapted to lift the pawl 118 out of the nicks 122ª when pressed against the handle 117ª, with which the arc 117 is provided, thereby leaving said arc free to move on the pivot 124ª for the purpose above mentioned—viz., to locate the contact-piece 112 opposite one or another of the plates 111, &c.

Each of the plates 111 111ª, &c., is selected with reference to the number of spaces required by a given line, the plate 111$^i$ in the machine illustrated being constructed to gage a line shortage which is to be divided into four parts, as shown in Fig. 11; plate 111$^h$ to gage a line shortage which is to be divided into five parts, as shown in Fig. 13; plate 111$^f$ to gage a line shortage which is to be divided into seven parts, as shown in Fig. 12, and so on through the series of plates. In Figs. 11 to 13 the stepped lines represent the successive steps of the gages, and the vertical dotted lines represent the gage projection 112. Each of the gage-steps is made to accurately represent piles of each size of spaces in the different channels 123, the successive gages representing piles of four, five, six, &c., of spaces. In Fig. 14 the relation of the gage 111$^h$ to the spaces is shown, the successive steps of the gage representing piles of five of the successive sizes of spaces, as illustrated. This illustration in Fig. 14 applies also to the other gages, except that the successive steps would represent piles of four, six, seven, &c., spaces of different sizes. The nicks 122ª are located with reference to the pawl 118, according to the number of spaces the line requires. The contact-piece 112 swings back and forth in a slot in the guide-block 125, fast to the frame A, and is thereby kept rigid against the longitudinal movement of said plates. The measurement taken by the type-line gage 120 is reproduced or duplicated by the contact-piece 112, and the position and construction of these two parts are such that when a full line of type is inserted under said gage and the pawl 118 is set in the nick or graduation 4 of the arc 117 said contact-piece registers with the reference-line 112$^b$ on the plate 111$^i$. In the drawing, Fig. 8, the plate 111$^i$ has its shoulders cut to gage lines having four spaces, so that if the contact-piece 112 should be moved downward only enough for the left end of the plate 111$^i$ to pass over it this would indicate that the line has only room enough to receive four of the thinnest spaces, and so on, an amount equal to the distance from that part of the plate 111$^i$ to the reference-line 112$^b$ being needed to make the line a full one. The drawing shows in Fig. 7ª the contact-piece 112 under the ninth shoulder of the plate 111$^g$, indicating that six of the ninth size of spaces are nearly enough to fill the line. As already stated, the connected arms 224 and 224ª, the former supporting the space-plunger 409 and the latter the plates 111, &c., move simultaneously. Said arms are held sensitively in position relative to each other by means of the spring 420. The arm 224 is capable of being forced a short distance to the right away from the tension-arm 224ª and against the spring 420. The distances from the contact-piece 112 to the different space-channels 123 are equal to the distances between the plunger-blade 409 when held in its normal position by the spring 420 and the various corresponding steps in the gage-plates 111 111ª, &c. Consequently when the arm 224ª is intercepted in its motion to the left in Figs. 1 and 2 and right in Figs. 3 and 4 by the contact between one of the shoulders of one of said plates and said contact-piece said blade is brought into line with the space-channel 123, which contains the particular size of spaces represented by the particular shoulder intercepted above said contact-piece.

The swinging arm 224 is provided with a lateral T-groove for the reception of the plunger-blade 409, and said blade has the engaging block or pin 423, by means of which a longitudinal movement is imparted to the same through the medium of the U-shaped catch 422 of the sliding sleeve 421 on the space carrying or transferring arm 227. The front terminal of the blade 409 is decreased in size to permit of its passage through any one of the holes 127 behind each space-channel 123 for the purpose of dislodging the bottom space therein. The stop-rib 408 is affixed to the front of the reservoir 123 at a suitable distance from the bottom thereof to prevent more than one space from being disturbed by the blade 409 at a time. This stop-rib is inclined, as shown in Fig. 8, to provide openings thereunder of different depths for the different sizes of spaces. The arm 227, which carries the spaces from the reservoir to the line, is also mounted on the pivot or stud 226, independent of the arms 224 and 224ª, and provided with a slide-bearing for the block 421. Besides the U-shaped catch 422 the knurled handle 417 is attached to the block 421, by means of which the latter is operated back and forth and the arm 227 is swung. The arm 227 extends through an opening in the frame A to the front of the machine beyond the reservoir-channels 123. The space reservoirs or channels 123 are provided with the rack 416, having teeth respectively and correspondingly located relative to said channels—that is, the distance between any two adjacent teeth on said rack is the same as the distances between any two adjacent space-channels. The rack 416 is rigidly fastened to the frame of the channels 123 and projects to the right into the path of the engaging point 413 of the spring-actuated engaging pawl 414, which is pivotally connected to the laterally-extending support 324, said support being connected to and forming a part of the arm 224ª. The spring-actuated hanging part 307, Fig. 2, is pivoted to the support 324 below the pawl 414 and has the stop 306 on its free end adapted to be raised into the path of the arm 227 and adjust the same by checking it opposite the reservoir-channel 123, containing the required spaces, when said arm is swung to the right.

The platform 410 is a projection from the front end of the space-carrying arm 227 and has the space-receiving box-like opening or receiver 521. The block, which follows behind the space as the latter is transferred from a position in front of its reservoir to the assigned place in the line-channel 121, is called the "space-pusher" 509 and forms a rigid part of the transferring-arm 227. The space-pusher 509 is provided with the overreaching gate 500, hinged at 510 to the bottom space-support 538. The space-support 538 and the gate 500 are adapted to slide to the right and left with reference to the pusher 509, the former being fastened beneath the latter by means of the shouldered screws 522, and said support and gate are normally pressed in the direction of the line-channel 121 by the resiliency of the spring 514, interposed between the enlarged left end of the bolt 515 and a suitable lug of the platform 410. The bolt 515 extends to the left from a depending ear on the support 538. The gate 500 has the projecting pin 501 for engagement with the cam-plate 520, which is rigid with the frame of the reservoir-channels 123. The arrangement of the plate 520 relative to the pin 501 is such as to cause the latter to ride onto the former at the proper time and elevate the left end of the gate 500, thereby making a passage-way for the transfer of a space from the receiver 521 prior to introducing said space into the line-channel 121. The right wall of the channel 121 has the opening 412 in its upper part for the passage of the space being acted upon.

I will now describe the remainder devices.
The vertical post 300 has a travel sufficient in length to traverse the amount of difference between piles of succeeding sizes of spaces. Said post is provided with the projection or roller 310ª and the gage projection 338, Figs. 1, 2, and 8. The horizontal rod 303 slides in the bearings 301 and 301ᵇ and has the tapering remainder-gage 304 connected thereto in such a manner that said rod can be rotated without affecting said gage; but the latter must travel with the former longitudinally. The gage projection 338 extends under the type-line and is employed, after said line has been measured by one of the gage-plates 111, &c., to ascertain the largest size of spaces applicable thereto without making the same too long for the width of the column, which may be termed the "quotient" size. At the proper time the tapering gage or wedge 304 is thrust to the left under the roller 310ª until the post 300 is raised sufficiently to take up whatever looseness remains in the line.

The rod 303 is provided with the ratchet-teeth 326, which are engaged by the spring-actuated pawl 320, pivoted to the lever 202ᵇ of the swinging L-pawl 202, and by means of said swinging pawl and teeth said rod is intermittently moved to the right, Fig. 9. The angle of inclination in the wedge 304 is such that the amount of incline or vertical measurement between two points separated lengthwise by a distance equal to that between two of the teeth 326 is equal to the difference between two successive sizes of spaces, or what I have termed a "space unit." The right-hand terminal of the wedge 304 is capable of abutting the lug 316 on the front of the flat spring 315 at the top, Figs. 2 and 7. The spring 315 is fastened to the frame A and hooks over the spur 318 on the upwardly-spring-tensioned post 317. The spring 319 encircles the vertical post 317 between its lower bearing and a pin projecting from said post, and the latter is caused by said spring to move upward when released from the hooked end of the spring 315. The post 317 has the T projection 309 at the top, said projection being cut away in its upper part to form the incline 310. The upward movement of the post 317 causes the T projection 309 to strike the intercepting roller 308 on the stop 306 and raise the latter.

The operation of the machine is as follows: The column of loose unjustified type, preferably without any spaces between the words, is first placed in the lower right-hand galley a, the lines being leaded to prevent the unconfined uneven ends from becoming mixed. The usual spring-tensioned block being placed behind or at the right of the column in the galley a, said column is pressed to the left against the limiting-wall 201 and the lead at the end adjoining said wall withdrawn by hand. Glancing over the face of the type before him, the operator counts the places for spaces in the first line and by manipulating the handle 117ª and raising the lever 142, both being grasped together, swings the arc 117 until the nick 122ª, corresponding with the result of his count, as indicated by the scale 122, is under the pawl 118, when by releasing said lever said pawl drops into said nick to fix or hold said arc in position. The arc 117 by reason of its connection with the parallelogram-bars 119 and 119ª locates the contact-piece projection 112 under the particular gage-plate 111, &c., which is especially constructed with reference to gaging a line shortage containing the same number of spaces as those required in the line now in the channel 121. By manipulating the handle 206 the operator rotates the rod 203 sufficiently to swing the gage-block 120 within the channel 121 and above the end of the line. Then by a downward pressure on the handle 206 the gage 120 is brought onto the top of the line, clamping it firmly between said gage and the gage projection 338. Since the contact-piece 112 is connected with the gage-block 120, said projection is located by the last operation at a height corresponding to the length of the line to register the amount of the shortage. Next in order the operator moves the arm 224ª to the right, at the same time holding pawl 413 out of engagement with the ratchet 416, Figs. 1 and 6, until one of the steps or shoulders on the gage-plate 111, &c., comes in contact with the contact-piece 112. The pawl 413 is then engaged with one of the ratchet-teeth 416 in accordance with the relative position of the arm 224ª, to which said pawl is pivoted, as determined by the plate 111, &c., and the contact-piece 112, the engaged tooth 416 corresponding to the intercepting shoulder. The pawl 413 serves to hold the arm 224ª in position after the projection 112 is withdrawn and during the operation of spacing the line. The gage-plate and the engaged tooth 416 also correspond, as already stated, to the space-channel 123, which they represent or designate, an interdependence or correlation, as it were, existing between these three members. As already intimated, the plunger mechanism is held away from the right support 324 of the arm 224ª by means of the spring 420, which normally keeps said mechanism continually to the left in line with the channel 123, containing the size of spaces selected by the said gage-plate. The space-plunger mechanism, located as just described, is in position for commencing the operation of inserting spaces of the required size between the words in the channel 121.

While the several mechanisms are located as hereinbefore explained, and inasmuch as the probabilities are that there is a slight remainder or looseness vertically between the top of the gage projection or contact-piece 112 and the stepped gage-plate 111, &c., under which the former is situated, the operator seizes the handle 302, rotates the rod 303 until the teeth 326 are turned away from the pawl 320, and pulls said rod to the left, thereby causing the gage projection 338 under the line and the gage-block 120 above the same to be raised with said line between and also the connecting parts, including said contact-piece until said looseness has been taken up. This result is obtained by the wedging action of the tapering gage 304 as it is actuated beneath the roller 310ª. After the handle 302 has been thus pulled to the left it is turned back into position with the teeth 326 under the pawl 320, the former being brought into position to be engaged by the latter. The machine is now in readiness for the actual work of inserting the selected spaces into the type-line, and this is accomplished in the following-described manner: With his hand on the handle 417 the operator swings the arm 227 to the right and engages the space-plunger pin 423 with the catch 422 on the block 421. By pressing the handle 417 hard to the right to overcome the resiliency of the spring 420 the space-plunger arm 224 and the platform 410 of the transferring device are swung to the right until the arm 227 is brought into contact with the support 324 of the locating-arm 224ª. The space-plunger 409 is now in position behind the channel 123, which contains the next larger size of spaces than would be required were only one size to be used. By drawing the handle 417 forward the plunger 409 is given a forward longitudinal movement and the space in front of it is thrust out of the channel 123 and into the receiver 521. Upon the completion of this movement the operator pushes the handle 417 backward again and then carries it to the left to actuate the space-receiving device in the same direction toward the line-channel 121. When approaching the channel 121, the space-support 538 is brought into contact with the right wall of said channel and is intercepted in its travel, and the gate 500 is given an upward movement by means of the cam-plate 520. Since the gate 500 is pivoted to the bottom support 538, it is also intercepted with the latter. The space-pusher 509 continues in its movement to the left until the abutting space is thrust beyond the right wall of the channel 121 and against the upper end of the pawl 202, which is pressed backward from the channel 121. By reason of the continued pressure on the handle 417 the space is held suspended between the pusher 509 and the pawl 202, remaining in that condition until the operator with his left hand manipulates the rule 200, so as to raise the next word in the line above said pawl. As said word rises in the channel 121 it encounters the suspended space and carries the same into the upper part of said channel adjacent to the galley b, upon which the justified lines are received and arranged in column formation.

As will be clearly seen, the movement to the left of the pawl 202 produces a corresponding movement to the right of the pawl 320, which causes the rod 303 of the difference device to return to the right one tooth at a time until its initial position is reached. The movements described above continue as the words are successively transferred from the lower part of the line-channel 121 to the upper end thereof, and upon the transfer of each word the difference device and the rod 303 are forced to the right one tooth to the word. Upon the displacement of as many words as there are space differences in the remainder, being the amount displaced by the wedge 304, the right end of said wedge comes in contact with the lug 316, causing the spring 315 to release the spur 318 and allow the post 317 to move upward under the influence of the spring 319, carrying with it the stop 306 against the weaker spring of the part 307, between the arm 227 and the support 324. After these latter movements have taken place and the arm 227 and the support 324 have been prevented from coming together on account of the intervention of the stop 306 the operator is no longer able to force the plunger-arm 224 against the action of the spring 420, as before, in order to bring the plunger 409 opposite the channel 123, from which the first spaces were taken; but the front end of said plunger is now located adjacent to the next channel at the left, and by the longitudinal movements of this displacing member the succeeding smaller size of spaces are pushed from said last-mentioned channel. The operation of inserting the smaller size of space into the line continues until the required number has been reached and said line is accurately justified, when the operator transfers it into the galley $b$ by manipulating the rule 233, previously referred to. When the arm 224ª, with the gage-plates 111 111ª, &c., are returned to their normal positions at the left, the roller 308 encounters the incline 310 and depresses the T projection 309 and the spring-actuated post 317 until the spur 318 is engaged by the hooked end of the spring 315.

It will be evident that various changes in details of construction and relative arrangement of parts may be made without departing from the invention. It will be evident also that the broader features of the invention may be employed not only in machines for justifying composed lines of type or the like, but in line-justifying mechanism of other classes, and the broader claims are not to be confined to mechanism for justifying such composed lines, although the mechanism shown is, in fact, especially adapted for that purpose, the term "justifying mechanism" herein being used in a broad sense to include all classes of typographic work in which lines are to be justified for printing or the production of printing-surfaces. The word "type" is used herein to include not only ordinary type, but also matrices and the like of any suitable material.

While the broader claims herein are intended to include and cover constructions in which a gage or gages having an incline for dividing the line shortage by the number of intervals are used, I do not herein claim, specifically, justifying devices or gages having an incline or inclined gaging-surfaces, as these specific subject-matters are claimed in my applications Serial Nos. 550,015, filed May 20, 1895, and 555,669, filed July 11, 1895, the present application claiming specifically the stepped form of gaging-surface, although the claims not thus limited are to be construed, broadly, in accordance with their terms.

What I claim is—

1. A mechanism for justifying composed lines of type, comprising devices for registering the number of intervals in a line, devices for measuring the line, and means controlled by said devices for determining the widths of the justifying-spaces.

2. A mechanism for justifying a composed line of type, comprising devices for registering the number of intervals in a line, devices for measuring the line, means controlled by both said devices for determining the widths of the justifying-spaces, and means for inserting said spaces.

3. In a mechanism for justifying a composed line of type, a line-measuring device in combination with a gage constructed to predetermine by its operative surface the widths of the spaces required to justify different lines.

4. In a justifying mechanism, a line-measuring device, in combination with a justifying-gage, said device and gage operating to determine by their relative adjustment the justifying-spaces for all possible lines.

5. In justifying mechanism, a justifying-gage, in combination with means for measuring the shortage of a line and applying said measurement to said gage to predetermine the justifying-spaces for the line.

6. In a justifying mechanism, a gage having an operative surface constructed to correspond to the different numbers of intervals in lines of print, a device for measuring a line, and means for bringing said device and gage into operative relation to determine the justifying-spaces for the line.

7. In a mechanism for justifying lines of type, a stepped justifying-gage, in combination with means for measuring the shortage of a line of type and applying said measurement to the gage to determine the justifying-spaces for the line.

8. In a justifying mechanism, a gage having an operative surface constructed to correspond to the different numbers of intervals in lines of print, in combination with means for adjusting the gage for a line, and means for measuring the line and applying said measurement to the adjusted gage to determine the justifying-spaces for the line.

9. In a justifying mechanism, a series of stepped justifying-gages corresponding to the different number of intervals in lines of print, in combination with means for selecting the proper gage for a line, and means for measuring the line and applying said measurement to the selected gage to determine the justifying-spaces for the line.

10. In a type-justifying machine, the combination with a magazine provided with a limited number of sizes of spaces, of justifying means constructed and operating to predetermine and select justifying-spaces of two consecutive sizes to justify a line.

11. In a mechanism adapted to justify lines of characters with justifying-spaces of two consecutive sizes, means, controlled by the shortage and the number of intervals, for automatically selecting the proper sizes of spaces and the relative numbers thereof.

12. In a type-justifying mechanism, the combination of a justifying-gage, means for measuring the shortage of a line of type and applying said measurement to said gage to determine the two consecutive sizes of justifying-spaces for the line, and a difference device adapted to determine the relative number of spaces of each size required for justification.

13. In a mechanism adapted to justify lines of characters with justifying-spaces of two consecutive sizes, means for selecting the two required sizes of spaces from a limited number of sizes, means for determining the number of spaces of each size to be used, and means for automatically shifting the space-selecting mechanism when a sufficient number of the spaces of the first size have been selected.

14. In mechanism for justifying lines of characters with spaces of two consecutive sizes, means for predetermining the sizes of the spaces, and devices adapted to be set for selecting word-spaces of one size, in combination with mechanism for resetting said devices, if necessary, during the justification of a line to effect the selection of word-spaces of the next consecutive size.

15. In mechanism for justifying lines of characters with spaces of two consecutive sizes, a space-determining device adapted to be set for word-spaces of one size, in combination with difference devices constructed to reset said space-determining device during the justification of a line to effect the selection of spaces of the next consecutive size.

16. In a justifying-machine, a controller for timing a movement, comprising a movable part adapted to be set back in proportion to the time which is to elapse before causing said movement, and means for imparting a regulated forward movement to said part.

17. In a justifying-machine, a controller for timing a movement, comprising a part adapted to be set back, and means for imparting a step-by-step forward movement to said part.

18. In a justifying-machine, a controller for timing a movement, comprising a toothed part adapted to be set backward, and means for imparting a step-by-step forward movement to said part, the required timed movement taking place when the forward movement of said part equals its backward movement.

19. In a justifying mechanism, the combination with a magazine provided with a limited number of sizes of spaces, of means for selecting spaces of two consecutive sizes to justify a line, and a controller for effecting the change from one size to another comprising a part adapted to be set backward, and means for imparting a partial forward movement to said part each time a word-space of the first size is selected.

20. In a machine for justifying composed lines of type with spaces of two consecutive sizes, the combination of means, controlled by the shortage and the number of intervals, for automatically selecting the proper sizes of spaces, and a controller adapted to be set back before justifying the line and to control by its forward movement during the justification the relative numbers of the two sizes of spaces required.

21. In a mechanism for justifying composed lines of type with spaces of two consecutive sizes, the combination of a justifying-gage, means for measuring the shortage of a line and applying said measurement to said gage to determine the justifying-spaces for the line, and a controller arranged to automatically govern the relative numbers of the two sizes of spaces selected for the line.

22. In a type-justifying mechanism, the combination of means for measuring the shortage of an unjustified line of type, means adapted to be set in accordance with the number of intervals in the line, and a difference device including a controller which is adapted to be set back and to have a forward movement during the operation of justifying the line, whereby the number of each size of justifying-spaces in the line is determined.

23. In a mechanism for justifying composed lines of type, a justifying-gage, in combination with means for measuring the shortage of the unjustified line, means for applying said measurement to said gage to determine the justifying-spaces, and means for inserting said spaces in the line.

24. In a justifying-machine having a limited number of sizes of justifying-spaces, a gage for determining the largest size of spaces which can be inserted uniformly in the line, in combination with a gage for measuring the remainder required to complete the justification of the line.

25. In a justifying mechanism, a gage having a plurality of series of steps, the steps of each series corresponding to piles of successive sizes of justifying-spaces, each pile having the same number of spaces.

26. In a justifying mechanism, a gage having a plurality of series of steps, the steps of each series corresponding to piles of successive sizes of justifying-spaces, each pile having the same number of spaces, and the different series of steps corresponding to piles having different numbers of the several sizes of spaces.

27. In a type-justifying machine, the combination of a space-magazine provided with several successive sizes of spaces, a gage having a plurality of series of steps corresponding to piles of said spaces containing various numbers and sizes, and means for utilizing the gage to select justifying-spaces for lines of type.

28. The combination, in a type-justifier, of line-measuring devices, and a plurality of gages corresponding with different numbers of intervals in type-lines, with mechanism for bringing the appropriate gage into operative relation with the line-measuring devices.

29. The combination, in a type-justifier, of a plurality of gages corresponding in number with the different numbers of intervals in type-lines, said gages being constructed to represent piles of successive sizes containing successive numbers of spaces, with mechanism for trying said gages into a space equivalent to the line shortage until one is found which most accurately fits it.

30. The combination, in a type-justifier, of a plurality of stepped gage-plates, each of said plates representing piles of different numbers and each step thereon different sizes of spaces, with mechanism for selecting one of said plates and trying the same into a space equal to the line shortage until that one of its steps is found which most nearly fills said shortage, for the purpose set forth.

31. In a type-justifier, in combination, a line-gage adapted to rest upon an unjustified type-line and indicate the length of said line at a point remote therefrom, a series of gages representing different piles of defferent sizes of spaces, and means to bring a connection of said line-gage into operative relation with said last-mentioned gages, for the purpose set forth.

32. In a type-justifier, in combination, a line-gage arranged to rest upon an unjustified type-line, a member connected with said gage and adapted to indicate the length of said line at a point remote therefrom, and a series of gages representing different piles of different sizes of spaces, capable of being brought into contiguity with said member, for the purpose set forth.

33. In a type-justifier, in combination, a longitudinally-movable rod carrying a line-gage adapted to extend across the line-channel, an intermediate gage connected to said rod, a series of stepped gage-plates representing the probable amounts of line shortages and numbers of spaces necessary for type-lines, and means for adjusting said intermediate gage to the gage-plate representing the number of spaces required in a given line, for the purpose set forth.

34. In a type-justifier, in combination, a line-measuring gage-block, gage-plates representing different numbers of spaces, a projection operatively connected with said block and extending into the path of said plates, parallelogram bars adapted to swing said projection into alinement with the required plate, and means for locking said projection in position, for the purpose set forth.

35. In a type-justifier, in combination, an intermediate gage adapted to traverse a distance equal to the line shortage, adjustable gages arranged to represent different numbers and sizes of spaces, and the space-plunger mechanism designed to move synchronously with said adjustable gages, for the purpose set forth.

36. In a type-justifier, in combination, a series of movable gage-plates representing different line shortages, a space-plunger blade, and a space-receiving platform, said blade and platform being arranged to move synchronously with said plates, for the purpose set forth.

37. In a type-justifier, in combination, a line-measuring gage projection, gage-plates adapted to move over said gage until intercepted thereby, a plurality of space-reservoirs having a series of correlative ratchet-teeth fixed thereto, and a pawl operatively connected with said plates, arranged to move simultaneously therewith and engage one of said teeth, for the purpose set forth.

38. In a type-justifier, in combination, a plurality of space-reservoirs arranged side by side, a space-plunger blade transversely adjustable relative to said reservoirs, an independently-mounted, movable, space-receiving platform, and means for reciprocating the latter between said reservoirs and the line-channel, for the purpose set forth.

39. In a type-justifier, in combination, a plurality of space-reservoirs arranged side by side, a space-plunger blade transversely adjustable relative to said reservoirs, and an independently-mounted, movable, space-receiving platform, for the purpose set forth.

40. In a type-justifier, in combination, a plurality of space-reservoirs, a space-plunger blade adjustable relative to any one of said reservoirs, a space-receiving device arranged to reciprocate between a position adjacent to said blade and the line-channel, and mechanism adapted to transfer a space from said receiving device into said line-channel, for the purpose set forth.

41. The space-transferring device, in a type-justifier, consisting of a space-support, a space-pusher, and a movable guard adapted to be opened as said device approaches the line-channel, as specified.

42. In a type-justifier, in combination, a pawl operating across the line-channel, adapted to support one or more words thereon, and a space-pusher designed to force a space against said pawl and hold the same suspended until removed by the passage of a word through said channel, for the purpose set forth.

43. In a type-justifier, in combination, a plurality of space-reservoirs, an arm adjustable with reference to one or another of said reservoirs, a second arm provided with a space-plunger, yieldingly separated from said first-mentioned arm by a distance equal to that between two succeeding space-reservoirs, but capable of being pressed against the same, and a stop adapted to be introduced into the action between said arms to positively maintain said distance between them, for the purpose set forth.

44. In a type-justifier, in combination, a primary measuring device and a difference-measuring device adapted to engage opposite ends of a type-line, said difference device provided with ratchet-teeth, a member capable of being actuated by the introduction of each space into said line, and a pawl attached to said member, registering with said teeth, for the purpose set forth.

45. The difference-measuring device, in a type-justifier, consisting of a post carrying a gage projection adapted to engage one end of a type-line, a rod provided with a wedge capable of moving said post, and means for intermittently actuating said rod, dependent upon the introduction of spaces into said line, as specified.

46. In a type-justifier, in combination with the primary measuring device, a post carrying a gage projection adapted to engage one end of a type-line, a rod provided with a gage capable of moving said post, and means for intermittently actuating said rod, dependent upon the introduction of spaces into said line, for the purpose set forth.

47. In a type-justifier, in combination, a post carrying a gage projection adapted to engage one end of a type-line, a toothed rod provided with a wedge capable of moving said post, a pawl extending into the line-channel, arranged to swing each time a space is introduced into said line, and a second pawl dependent upon the first for its action, registering with the teeth on said rod and intermittently actuating the same, for the purpose set forth.

48. In a type-justifier, in combination, a toothed rod provided with a wedge, a spring-actuated post, a hooked member adapted to hold said post against the resiliency of its spring, and a pawl arranged to actuate said rod and wedge against said member, thereby releasing said post, for the purpose set forth.

49. In a type-justifier, in combination, a remainder-measuring device provided with ratchet-teeth, a pawl adapted to engage said teeth and return said device to its normal position, and a tripping device actuated by the return of said remainder device, whereby the mechanism changes from one size of spaces to the next, for the purpose set forth.

50. In a type-justifier, in combination, a laterally-adjustable space-plunger, locating mechanism for said plunger, a stop, means for holding said stop from between said mechanism and plunger, a remainder device, and other means for introducing said stop between said first-mentioned parts upon the return of said device to its normal position, for the purpose set forth.

51. In a type-justifying mechanism, the combination with means for measuring a line, of a counting-rack, and a pawl arranged to lock said rack in position to indicate the number of intervals in the line.

52. In a type-justifying mechanism, the combination with means for measuring a line, of a counting-rack, a pawl arranged to hold said rack in position to indicate the number of intervals in the line, and means to hold said pawl out of engagement with the rack during its adjustment.

53. In a type-justifying mechanism, in combination with means for measuring a line, a justifying-gage, a contact-piece, and means for adjusting said contact-piece in accordance with the length of the unjustified line, and the number of intervals therein.

54. In a type-justifying mechanism, in combination with means for measuring a line, an adjustable justifying contact-piece, a word-counting rack, and means for locking said rack in position corresponding to any number of intervals in the line.

55. In a type-justifying mechanism, the combination of a pair of pivoted parallel bars a justifying-stop carried by said bars, a counting-rack connected to one of said bars for adjusting said stop, and a pawl for locking said rack in any desired adjustment.

56. In a type-justifying mechanism, the combination of a pair of parallel pivoted bars, a link connecting the free ends of said bars, a stop mounted on said link, means for adjusting said bars in accordance with the number of intervals in the line, and a justifying-gage coöperating with said stop.

57. In a type-justifying mechanism, a line-measuring gage which is adjustable in the direction of the line-channel and movable laterally to said channel to permit the line to pass after it is measured, in combination with means controlled by said gage for selecting justifying-spaces.

58. In a type-justifying mechanism, a rod movable longitudinally and about its axis, in combination with a line-measuring gage attached to said rod, a line-channel adjacent to said rod, an abutment against which the line is measured, and means controlled by gage for selecting justifying-spaces.

59. In a type-justifying mechanism, the combination with a longitudinally-movable rod, of a line-gage carried by said rod, and a stop, such as the part 112 also carried by said rod, said stop having an independent lateral movement in accordance with the number of intervals in the line.

60. In a type-justifying mechanism, the combination with a series of gages, of a stop such as 112 coöperating with said gages to select the proper spaces to justify lines of type, a line-measuring gage connected to said stop and movable in accordance with the shortage of the lines, and a counting device also connected with said stop and movable in accordance with the number of word-intervals in the line, for the purpose set forth.

61. In a type-justifying mechanism, the combination with means for determining the widths of justifying-spaces and a space-magazine, of means for ejecting spaces and means for relatively adjusting said magazine and ejecting means to select the spaces.

62. In a type-justifying mechanism, the combination with a type-magazine having channels for successive sizes of justifying-spaces, a plunger for ejecting spaces, and a guard in front of the magazine having a straight lower edge inclined to the bottom of said magazine, said guard being arranged to permit the lowest space of each channel to pass and to retain the second and higher spaces.

63. In a type-justifying mechanism, the combination with a space-magazine, means for selecting justifying-spaces and a plunger for ejecting spaces from the magazine, of a line-channel, a device for carrying ejected spaces from the magazine to said channel, and means for parting a line of type and inserting said spaces therein.

64. In a type-justifying mechanism, the combination with a space-magazine, of justifying-space-selecting devices, a receiver in front of said magazine into which the spaces are ejected from the magazine, and means for moving said receiver laterally to carry said spaces into the line under justification.

65. In a type-justifying mechanism, the combination with a magazine for justifying-spaces, of justifying-space-selecting devices, an arm movable laterally, a space-ejecting plunger carried by said arm in the rear of the magazine, and a space-receiver in front of the magazine, said receiver being also movable laterally to carry the space to the line.

66. In a type-justifying mechanism, the combination with a space-magazine having channels for several sizes of spaces, of a pivoted arm in the rear of said magazine, means for adjusting said arm to select justifying-spaces, and a reciprocating device carried by said arm to eject the justifying-spaces.

67. In a type-justifying mechanism, the combination with a magazine having channels for several sizes of spaces, of a receiver movable laterally in front of the magazine, a pivoted latch for holding a space in the receiver, and means for raising the latch at the proper time to permit the space to be discharged from the receiver into the line.

68. In a type-justifying mechanism, the combination with a channel in which the words are separated for the insertion of justifying-spaces, with a pawl adapted to enter said channel and support the spaced portion of the line.

69. In a type-justifying mechanism, the combination with an upper galley for justified matter, a lower galley for unjustified matter, and a channel connecting said galleys, of means for separating the words in a line and moving them through said channel, means for inserting justifying-spaces between the words in said channel, and a pawl arranged to normally enter said channel and support the spaced portion of a line.

70. In a type-justifying mechanism, the combination with a space-magazine having channels for several sizes of spaces, of an ejecting-plunger, a rack, serving as an index to correctly locate the plunger opposite the proper space-magazine and holding means coöperating with the rack.

71. In a type-justifying mechanism, the combination with a space-magazine having channels for several sizes of spaces, of a space-ejecting plunger movable laterally to the magazine, and a rack and pawl for locking said plunger in position opposite the proper channel of a magazine.

72. In a type-justifying mechanism, the combination with a space-magazine having a series of channels for several sizes of spaces, of a rack having its teeth corresponding to the channels of the magazine, a plunger for ejecting spaces from the magazine, and means for locating said plunger opposite the proper channel and locking it in such position by means of said rack.

73. In a type-justifying mechanism, the combination with a magazine having channels for several sizes of spaces, of a plunger movable laterally to said magazine, of a part limiting the lateral movement of said plunger whereby spaces of a certain size are selected, and an interponent, such as the part 306, adapted to be interposed to stop the plunger opposite a second channel of the magazine during the justification of a line.

74. In a type-justifying mechanism, the combination with a space-magazine having channels for several sizes of spaces, of an arm movable laterally to said magazine, an ejecting-plunger carried by said arm, a stop for the arm which is adjustable to locate the plunger opposite spaces of one size, an interponent adapted to be thrown in between said arm and stop to locate the plunger opposite an adjacent size of spaces, and a difference device arranged to throw in said interponent at the proper period in the justification of the line.

75. In a type-justifying mechanism, the combination with an interponent, such as the part 306, of a bolt having a head adapted to throw said interponent into operative position, a catch adapted to hold said bolt and interponent inoperative, a spring for throwing the bolt forward, and a difference device arranged to release said bolt at the proper period in the justification of a line.

76. In justifying mechanism, a word-space-determining device adapted to be set for word-spaces of any given value, in combination with automatic mechanism for resetting said device, if necessary, after a portion of the word-spaces of a line have been determined, to effect justification by varying the remaining word-spaces uniformly, substantially as described.

77. In justifying mechanism operating according to the quotient and remainder principle, a word-space-determining device adapted to be set for word-spaces of any given value, in combination with mechanism for resetting said device, if there be a remainder, after a portion of the word-spaces have been determined, to effect justification by varying the remaining word-spaces uniformly by a single unit, substantially as described.

78. In justifying mechanism, a word-space-determining device adapted to be set for word-spaces of any given value by a backward movement, in combination with mechanism for imparting to said device a forward movement during the justification of a line, substantially as described.

79. In a type-justifying machine, means for inserting spaces of two consecutive sizes in a line comprising a governing device adapted to be set back as many points as there are spaces of the first size and moved one point each time a space is inserted.

80. In a type-justifying machine, means for justifying a line with two consecutive sizes of spaces comprising a governing device, means for automatically setting back said governing device as many points as there are spaces of the first size in the line, and means for feeding forward said governing device one point for each space inserted in the line.

81. In a type-justifying mechanism, in combination, a governor device adapted to be set back an amount corresponding to the number of intervals in a line, means for moving said device forward one point each time a justifying-space is inserted in one of said intervals, and means operated by said governor device for starting the line mechanism as the last space is inserted.

82. In justifying mechanism, a word-space-determining device adapted to be set for word-spaces of any given value, in combination with automatic mechanism for resetting said device, if necessary, after a portion of the word-spaces of a line have been determined, to effect justification by varying the remaining word-spaces, substantially as described.

83. In justifying mechanism, the combination with, means for measuring the line of type, of a space-magazine, mechanism for dividing the shortage of a line by the number of intervals therein, and means controlled by said mechanism for selecting justifying-spaces from the magazine.

84. In justifying mechanism, the combination with a line-channel, and means for measuring a line of type in said channel; of a space-magazine, mechanism for dividing the shortage of a line by the number of intervals therein, and means controlled by said mechanism for selecting justifying-spaces from the magazine.

85. A mechanism for justifying a composed line of type comprising a device for measuring an unjustified line to ascertain the total shortage and devices for dividing the said shortage by the number of word-spaces in the line.

86. In a mechanism adapted to justify lines of characters with spaces of two consecutive sizes, the combination of means for determining normal justifying-spaces for a line, and means for selecting the two required sizes of spaces from a limited number of sizes.

87. In a mechanism adapted to justify lines of characters with spaces of two consecutive sizes, the combination of means for determining the normal justifying-spaces for a line, means for selecting the two required sizes of spaces from a limited number of sizes, and means for determining the number of spaces of each size to be used.

88. In a mechanism adapted to justify lines of characters with spaces of two consecutive sizes, means for determining justifying-spaces comprising a computing member movable in accordance with the number of word-spaces, and a line-measuring device, in combination with means for selecting the two required sizes of spaces from a limited number of sizes.

89. In a mechanism adapted to justify lines of characters with spaces of two consecutive sizes, the combination of means for determining normal justifying-spaces for a line, means for selecting the size of space provided in the machine which is next smaller than the normal, and means for measuring the difference between the aggregate of normal spaces and the aggregate of said smaller spaces, for the purpose set forth.

90. In justifying mechanism, in combination, a gage adapted to traverse the line shortage, a measuring device dependent for position upon said gage, a space-determining device, and connections between said space-determining device and said measuring devices whereby said space-determining device is adjusted in accordance with the two measurements.

91. In justifying mechanism, the combination with means for selecting a given number of such a size of spaces as will enter the shortage, of means for dividing what remains to be filled in said line into parts which correspond to the differences between individual sizes of spaces to be used.

92. In a type-justifying machine, in combination with a series of channels designed to contain successive sizes of spaces, a space-determining device representing said successive sizes, and means adapted to determine, in case the space-determining device register between two of said sizes, the proportional position of such registration relative to the two sizes and register the result in amounts corresponding to the difference between said two sizes of spaces.

93. In a justifying mechanism, the combination with a channel in which the words are separated for the insertion of justifying-spaces, of a pawl yieldingly pressed into the channel at one side, said pawl being adapted to support the spaced portion of the line, and means for moving a space into the channel against said pawl and beneath the spaced portion of the line.

94. In a type-justifying mechanism, the combination of a space-magazine containing different sizes of spaces, a plunger for ejecting spaces from the magazine, and means for adjusting the plunger opposite the proper channel in the magazine, said means being controlled by the shortage of the line to be justified and the number of intervals therein.

95. In a type-justifying mechanism, the combination with a space-magazine containing different sizes of spaces, of an ejecting-plunger movable laterally, a series of gages movable with said plunger, and a stop coöperating with the gages to locate the plunger opposite the magazine-channel containing spaces for the line under justification.

96. In a type-justifying mechanism, the combination with a space-magazine having a number of channels for different sizes of spaces, of an ejecting-plunger movable laterally to the channel, gages for locating the plunger opposite the channel containing one of the sizes of spaces for justification, and means for subsequently adjusting the plunger to an adjacent channel during the justification of the line, for the purpose set forth.

97. In a mechanism for justifying a composed line of type, a series of gages, in combination with a series of space-channels each containing spaces of uniform width, the spaces in each channel differing from the spaces in adjacent channels by approximately the same amount, combined with mechanism for supplying the line with spaces from one or more of said magazines of the proper size and number to justify the line.

98. In a mechanism for justifying a composed line of type, a series of gages, with a a series of space-channels each containing spaces of uniform width, the spaces in adjacent channels differing from one another by approximately the same amount, a space-selecting device for supplying the line to be justified with justifying-spaces selected from one or more of said channels, and connections between said series of gages and said device, whereby said device is properly set for each line to be justified.

99. In a mechanism for justifying a composed line of type, a series of gages, a space-selecting device for supplying the line to be justified with justifying-spaces, and connections between said series of gages and said device, whereby said device is primarily set for each line to be justified, combined with means for moving said device from the position in which it is so set to cause it to select the proper combination of spaces to justify the line.

100. In a mechanism for justifying a composed line of type, the combination of a device for measuring an unjustified line to ascertain the difference between the length of the set line and standard, means set by the measuring device to establish a point a distance from a certain fixed point proportional to said difference, and a series of gages adapted to be thrust between said two points, and a mechanism connected to the gage selected which is adapted when set by the setting of the gage to supply spaces which will justify the line.

101. In a justifying mechanism, means for determining the quotient of the line shortage divided by the number of intervals in the line, means for setting a space-determining device in accordance with the integral part of said quotient, and means controlled according to the fractional part of said quotient and adapted to reset the space-determining device during the operation of justifying, whereby the line may be justified by a combination of spaces having but two values.

102. In a mechanism for justifying composed lines of type, a space-selecting device, means for determining the quotient of the line shortage divided by the number of intervals in the line, means for setting the space-selecting device in accordance with the integral part of said quotient, and means controlled according to the fractional part of said quotient and adapted to reset the space-selecting device during the operation of justifying, whereby a line may be justified by a combination of spaces having but two values.

103. In a justifying mechanism, means for computing the normal justifying-space value for a line, in combination with a space-selecting device, means for adjusting the selecting device to one space value, a difference device, and means controlled by the difference device for resetting the selecting device.

104. In a justifying mechanism, a selecting device capable of selecting spaces from a limited number thereof, means for setting said device to one of the space values required, a controller governing the resetting of the selector if a second space value is required, a difference device, and connections whereby the controller is set from the difference device.

105. In a justifying mechanism, devices for selecting justifying-spaces from a limited number of sizes, comprising line-measuring and space-counting devices, means governed by said devices for selecting justifying-spaces of two sizes, and a controller adapted to be set by the justifying devices to determine the number of spaces of each size inserted in the line.

106. In mechanism for justifying lines of characters with spaces of two consecutive sizes, a gage and means for setting the same to correspond with the normal justifying-spaces for a line, in combination with means for selecting spaces of one size next to the normal, means for governing the number of such spaces inserted in the line, and means for automatically selecting such spaces of the other size next to the normal as may be necessary to justify the line.

BENJ. M. DES JARDINS.

Witnesses:
 ED. E. CLAUSSEN,
 EVA S. SHELTON.